Thos M. Millette, Sr.
Improved Wine & Cider Press.

No. 118144

Patented Aug 15 1871

Witnesses:
Parker H. Sweet, Jr.
Charles A. Randall

Inventor:
Thomas M. Millette Sr.
by his Attorney
James L. Norris.
Washington, D.C.

UNITED STATES PATENT OFFICE.

THOMAS M. MILLETT, SR., OF SAVANNAH, GEORGIA.

IMPROVEMENT IN WINE AND CIDER-PRESSES.

Specification forming part of Letters Patent No. 118,144, dated August 15, 1871.

*To all whom it may concern:*

Be it known that I, THOMAS M. MILLETT, Sr., of Savannah, in the county of Chatham and State of Georgia, have invented a new and useful Improvement in Wine and Cider-Presses; and I do hereby declare the following to be a clear and exact description thereof, sufficient to enable others skilled in the art to which my invention appertains to make and use the same, reference being had to the accompanying drawing forming part of this specification, in which—

Figure 1:
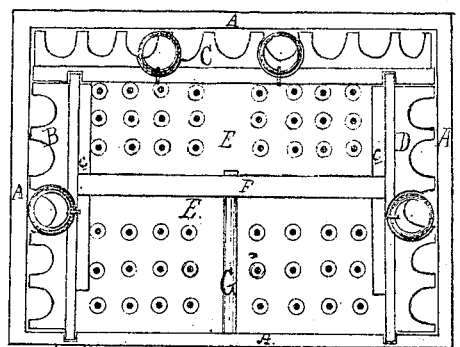
Figure 2:
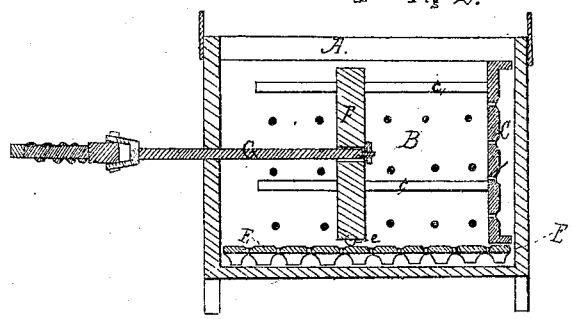
Figure 3:
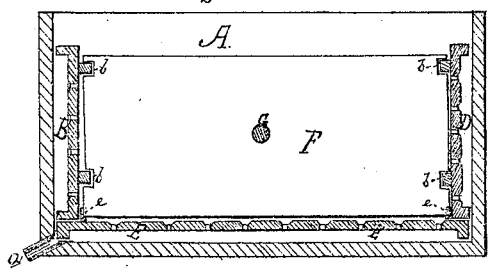

Figure 1 is a top plan view. Fig. 2 is a vertical cross-section. Fig. 3 is a longitudinal section.

My invention relates to an improved press, which can be used for pressing any substance from which it is desired to extract juice, but is specially constructed to be used as a wine and cider-press. It consists in providing three sides and the bottom of a square water-tight chest or tank with false removable sides and a false removable bottom, both sides and bottom being perforated, and operating, in connection with a press-board provided with rollers moving on guides on the faces of the false sides, to facilitate its operation, and having a shaft and endless screw, either or both, attached to it, and by means of which it is operated.

In the several figures like letters indicate like parts, and, referring thereto, A may represent the tank or cask, made of any desired shape, but preferably in the form of a parallelogram, or nearly so. On three of its sides and on the bottom are placed the hollow false sides B C D and false hollow bottom E. The sides B and D may be secured, and preferably are, in grooves in the front of the box or case and in the side or back C, in the manner shown. The bottom E may be made in three (more or less) separate pieces, so as to be the more readily removed, or it may be made in one piece; and the sides and bottom are provided with rings, hooks, or their equivalents, by means of which they can be lifted out of the case.

The several parts are made of wood and securely bound together to resist the great strain upon them incident to presses. The false sides and bottom are perforated so as to allow the expressed juice to pass through, and, instead of passing directly out of the case, it flows through the openings in the bottom flanges of the hollow sides down to the bottom and out at a suitable faucet, *a*. The perforations are preferably countersunk, so as to collect the juice and readily run it off.

F represents the press-board, which is also preferably made of wood, and has two (more or less) grooves, *b b*, cut in its sides, which engage with guide-rods or ribs *c c* on the sides B D, and thus direct the course of the press-board as it is forced inwardly. G is a shaft attached to this board, by means of which the board is moved; or, instead of this, an endless screw may be used, and a suitable crank or other motive power applied to it. Rollers *e e* are also attached to the lower part of the sides of the press-board F to facilitate its movements.

In operation my press is similar to others—that is, the materials (apples, grapes, or whatever else is to be used) are placed within the case, and, the press-board being moved inwardly, the juice is expressed and flows out at the faucet *a*.

The case may be provided with a lid or cover, hinged to it or removable, and secured down, when the press is used, by suitable braces or clamps.

The simplicity of this press will readily commend its use, and its advantages over others will be readily seen by those who use them. Though simple, its effectiveness is in nowise limited, and its operation is as perfect as any of the more complicated.

Having thus described my invention, what I claim as new, and desire to secure by Letters Patent, is—

The combination, in a wine and cider-press, of the perforated hollow false sides B C D and bottom E with the press-board F and shaft G, when all are constructed and operate substantially in the manner and for the purpose specified.

To the above specification of my invention I have signed my name this 27th day of February, 1871.

THO. M. MILLETT, SR.

Witnesses:
    A. DUTENHOFER,
    JOHN L. MARTIN.